Feb. 12, 1963
E. A. TAYLOR, JR
3,077,043
DISPLAY CHART MECHANISM
Filed Oct. 13, 1959
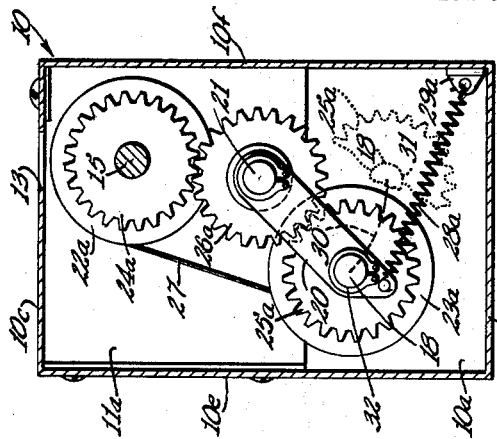
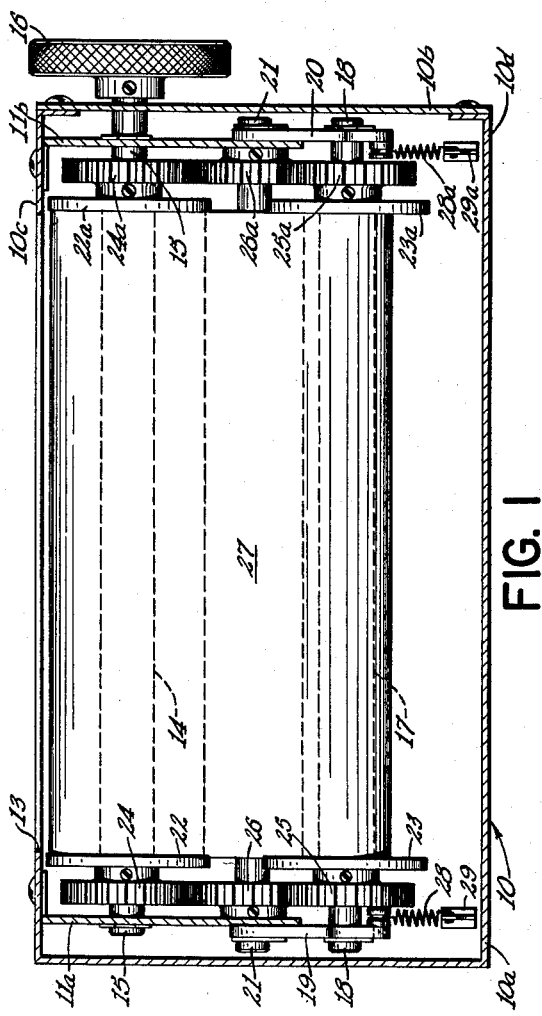
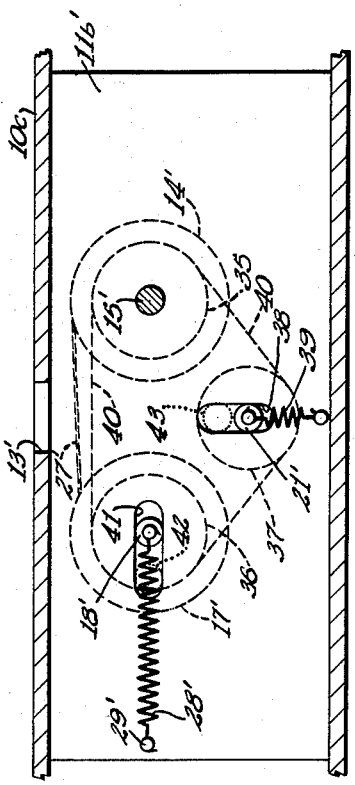
INVENTOR
ELMER A. TAYLOR, Jr.
BY
ATTORNEY 3,077,043
DISPLAY CHART MECHANISM
Elmer A. Taylor, Jr., St. Joseph, Mich., assignor, by mesne assignments, to Daystrom Incorporated, Murray Hill, N.J., a corporation of Texas
Filed Oct. 13, 1959, Ser. No. 846,086
4 Claims. (Cl. 40—95)

This invention relates to mechanical information display apparatus and more particularly to a roll chart mechanism for selecting and displaying various items of information which are desired from time to time.

Roll chart mechanisms, that is, arrangements utilizing a pair of spaced apart rotatable members with a chart stretched between them and having thereon various items of information, and adapted to be moved by rotating the rotatable members for bringing into view a selected bit of information on the chart are used in a number of present day applications. Such mechanisms are widely employed in electrical apparatus of the type used for testing a variety of like electrical components having different characteristics such as, for example, vacuum tubes, where some means is required for making readily available a selected small portion of a large amount of information. By the use of a roll chart, it is possible to store a great amount of information such as, for example, thousands of items of closely spaced small print, in a very small space and yet maintain it so that any portion of it may be readily available merely by a twist of a suitable roll chart actuating knob provided therefor.

The roll chart arrangements in common use are usually constructed with two rollers having substantially parallel axes of rotation, these axes being maintained in a fixed position. The chart which carries the desired information, which is to be viewed through an appropriate window, is stretched between the two rollers and is adapted to be rolled upon one roller, called the "take-up" roller and off the other, called the "feeder" roller when the chart is moved by the actuating knob in a given direction. When the direction is reversed, the feeder roller becomes the take-up roller and vice versa. These roll chart mechanisms have a number of inherent disadvantages.

One of the most important of these disadvantages results from the fact that whenever the mechanism is actuated beyond the mid-position (i.e., the position when the number of layers of chart paper on each roller is equal), the take-up roller has a greater number of layers of chart paper than the feeder roller and consequently requires that the paper be supplied to it at a rate greater than it can be supplied from the feeder roller. Since the axis of each roller is fixed, the result is that the chart becomes subjected to progressively greater tensile stress as it is moved closer to its end position under the viewing window. The chart is under the least tension when at the mid-position, and in fact in this position there is often a considerable amount of slack in the chart although it is quite taut at each end position. This is undesirable from the standpoint of smooth operation. It is further undesirable because the slack condition will cause the chart paper to occupy a position nearer to or further from the viewing window, depending upon the weight of the chart paper, distance between rollers, and other factors. This latter result can be quite unsatisfactory depending upon the position of the operator with respect to the viewing window and upon how near or far the chart is located from the window as a result of the slack condition.

Another disadvantage of such an arrangement is that the chart paper tends to move from the position to which it is set by the operator, thus necessitating a "guess" setting beyond the desired point, with the hope that the chart will creep back to the exact desired position for proper viewing of the desired information.

A still further disadvantage results from the fact that in order to move the chart in one direction, the actuating knob ordinarily provided with the mechanism must be moved in the opposite direction. This is contrary to the natural desire of most people to move the actuating knob in a given direction to cause the chart to move in the same direction.

Accordingly, it is an object of this invention to provide a roll chart mechanism which eliminates the foregoing disadvantages so commonly experienced with the usual roll chart mechanisms found in the prior art.

Other objects, along with various features and advantages of this invention will become apparent from a reading of the specification and claims taken in conjunction with the accompanying drawings, in which:

FIGURE 1 is a side view of a roll chart mechanism constructed in accordance with one embodiment of the invention, FIGURE 2 is an end view of the mechanism shown in FIGURE 1, and FIGURE 3 shows an end view of a mechanism constructed in accordance with a further embodiment of the invention.

Briefly, the invention includes a pair of rotating members for moving a chart connected to and adapted to be wound around one of the members and unwound from the other member as they are rotated. These members are connected by a mechanism which allows them both to be rotated in the same direction simultaneously. The axis of rotation of one of the rotating members is held in fixed relationship to the frame of the mechanism. The axis of rotation of the other rotating member is arranged to be movable with respect to the frame in a direction transvers to the axis. A resilient urging means is conneected to the rotating member having its axis movable for maintaining the chart under tension.

When the members are rotated in one direction, the chart is adapted to be rolled upon one of these members and unrolled from the other. Rotation of the members in the opposite direction, of course, produces chart movement in the opposite direction.

As the members are rotated, the location of the member having the movable axis is changed with respect to the position of the fixed member by the combined cooperation of the resilient urging means and the chart itself, for the purpose of maintaining the tension on the chart substantially constant at all times and regardless of whether the chart is at its mid-position or whether it is at either end position when the chart is substantially all wound about one of the rotating members.

Referring now to FIGURES 1 and 2, there is provided a case designated generally by the numeral 10 and having ends 10a, 10b, a top 10c, bottom 10d and sides 10e and 10f. A pair of fixed brackets 11a and 11b are also provided which, together with the case 10 provide a frame for supporting the mechanism to be described. The top of the case 10c is provided with a window 13 so that an operator may view a chart thereunder as will later appear.

Beneath the window 13 there is located a drive roller 14 having a shaft 15 for mounting the roller 14 on an axis which is fixed with respect to the brackets 11a and 11b. This shaft has an extended portion for carrying a manual drive knob 16 (shown only in FIGURE 1). A driven roller 17 is also provided, and has a shaft 18 which is mounted at opposite ends in a pair of movable support brackets 19 and 20, which are pivoted on a shaft 21 to allow movement parallel to a plane which is transverse to the axis of the roller 17. The axis of rotation of the movable roller 17, however, is at all times maintained substantially parallel to the axis of rotation of the fixed but rotatabe roller 14.

To the ends of the fixed roller 14 there is secured a pair of discs 22 and 22a, and to the ends of the movable roller 17 there is secured a pair of discs 23 and 23a. There are fixed respectively to the discs 22—22a, and 23—23a identical gears 24—24a and 25—25a. These gears, and hence the rollers to which they are secured are interconnected with a pair of gears 26 and 26a which are idler gears mounted to rotate about the axis of the shaft 21.

A chart 27, which can be for example a long paper strip chart, is also provided and is wound about the rollers 14 and 17 and secured at each end to each of these rollers in any convenient manner such as by the use of a suitable clip, glue, tape, etc. This chart is maintained in a state of tension by means of springs 28 and 28a, connected between the movable brackets 19 and 20, which carry the movable roller 17, and connection points 29 and 29a on the ends 10a and 10b respectively, which are fixed with respect to the roller 14.

When the drive knob 16 is rotated in a clockwise direction (refer to FIGURE 2), it will be seen that the drive roller 14 and driven roller 17 will rotate in a clockwise direction since the gears 24—24a and 25—25a connected to these rollers are meshed with the idler gears 26 and 26a. As the roller mechanism is actuated by the drive knob, the chart 27 will pass under the window 13, where the information displayed on the chart can be observed when the chart is brought to rest. As the chart is moving, the movable roller 17 will, besides rotating, also be moving in an arcuate path about the axis of the shaft 21 as shown by the arcuate line 30 in FIGURE 2. The position of the axis of rotation of the roller 17 at any given time will depend upon the relative portions of the chart which are wound upon the rollers 14 and 17.

When there is an equal amount of chart paper wound on each of the rollers 14 and 17 (the dead center position of the chart), the axis of the movable roller will be at some position 31 on the arc 30. However, as the mechanism is rotated from the dead center position, a greater amount of chart paper will be wound upon one of the rollers (the take-up roller) and, of course, will be unwound from the other roller (the feeder roller), thus varying the effective diameters of both rollers. Either of the rollers can function as the take-up roller or the feeder roller, depending upon the direction of chart movement. The further from dead center the mechanism is rotated, the greater will be the diameter of the take-up roller and the less will be the diameter of the feeder roller. As a consequence the chart paper will be wound about the take-up roller at a faster rate than the feeder roller is providing it, which would tend to increase the tension on the portion of the chart between the two rollers if the axis of both rollers were fixed. Since the axis of the roller 17 is movable however, this roller will move in a clockwise direction along the arcuate path 30 whenever the mechanism is moved away from dead center position toward the position tending to bring any portion of the chart in the direction of either end under the viewing window 13. When all of the paper is wound on either roller, the movable roller will be at some position 32. The springs 28 and 28a will function to provide substantially uniform tension on the chart at all times and will urge the movable roller 17 to the point 31 when the chart is in the dead center position.

A further embodiment of the invention is shown in FIGURE 3 wherein like numerals indicate like parts shown in FIGURES 1 and 2. In FIGURE 3, however, there is provided a pulley 35 secured to each end of the shaft 15' instead of the gears 24 and 24a, and a pulley 36 secured to each end of the shaft 18' instead of the gears 25 and 25a in FIGURES 1 and 2. A pair of idler pulleys 37 also replace the idler gears 26 and 26a on the shaft 21'. The shaft 21' however, is movable in FIGURE 3 in slots 38 in the brackets 11a' and 11b' against the tension of springs 39—39a secured to opposite ends of this shaft. A belt 40 is provided at each end of the rollers so that the driver roller 14' will rotate the movable driven roller 17'. It is important that provision be made for preventing any belt slippage by any suitable means such as for example a toothed belt and pulley. In FIGURE 3 the movable roller 17' is constrained to move in a linear manner by a pair of slots 41 instead of in the arcuate path 30 by the movable brackets 19 and 20 as in FIGURE 2.

The mechanism of FIGURE 3 is shown in the position when there is substantially more paper on one roller than on the other. By analogy with the description of operation above with respect to the embodiment shown in FIGURES 1 and 2, it will be appreciated that when the amount of paper on both rollers in FIGURE 3 is the same, the shafts 18' and 21' of the movable roller 17' and the idler pulleys 37 respectively, will be urged by the springs 28—28a and 39—39a respectively to the positions shown by the dotted circles 42 and 43.

This arrangement has an advantage over that of the arrangement of FIGURES 1 and 2, in that it operates more quietly by reason of the belt drive. This advantage can be very important from the standpoint of operation noise level when the roll chart is powered by an electric motor for moving a very long chart.

From the foregoing description, it will be clear that the roll chart mechanisms constructed in accordance with this invention have a number of important advantages over the mechanisms in general use. The chart itself is under substantially uniform tension at all times and there is no slack whatever, in contrast to the mechanisms in general use where the chart is under extreme tension at each end position and in a slack condition in the mid-position. Furthermore, since these limitations are not present in the mechanisms of this invention, a much greater length of chart paper can be used than with prior mechanisms. Additionally, the operation of the mechanisms constructed in accordance with this invention is inherently smoother, the chart moves in the same direction as the actuating knob, rather than in the opposite direction, and when the chart is once set to its desired posiion, there is no tendency for it to move, as is the case with the mechanisms in general use.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A roll chart mechanism comprising: a frame, a first roller having a fixed axis of rotation with respect to said frame and adapted to rotate about said axis, a second roller having a movable axis of rotation with respect to said frame and adapted to rotate about its axis, a strip chart suspended between said rollers and wound around at least one of said rollers, resilient means cooperating with said second roller for maintaining said chart in a taut condition, means mechanically coupled to said rollers for allowing said rollers to be rotated in the same direction simultaneously, said rollers being so positioned with respect to each other than when said rollers are rotated said chart is continuously wound upon itself in layer formation upon one of said rollers, the axis of the movable roller being caused to describe an arcuate path to thus vary the distance between the axes of said first and second rollers as a result of said chart being continuously wound upon itself as said rollers are rotated.

2. A roll chart mechanism comprising: a frame, a first roller having a gear on at least one end and having a fixed axis of rotation with respect to said frame about which said roller and gear are adapted to rotate, a second roller having a gear on at least one end and having a movable axis of rotation with respect to said frame about which said second roller and gear are adapted to rotate, said second roller being carried at its ends by a pair of pivotally movable supporting brackets, the axes of said rollers being maintained in substantially parallel relationship, an information bearing strip chart suspended between said rollers and wound around at least one of said rollers, spring means cooperating with said second roller for maintaining said chart in a taut condition, an idler gear coupled to the gears on said first and second rollers for allowing said rollers to be rotated in the same direction simultaneously, said rollers by being so positioned with respect to each other causing said chart to be continuously wound upon itself in layer formation upon one of said rollers, as said rollers are rotated, the axis of the movable roller being caused to follow an arcuate path about the pivot points of said movable supporting brackets as a center to thus vary the distance between the axes of said first and second rollers as a result of said chart being continuously wound upon itself on one of said rollers.

3. Apparatus as set forth in claim 2 and further including a manual drive knob secured to said first roller for driving said roll chart mechanism, and window means permitting a view of the information on said chart.

4. A roll chart mechanism comprising: a frame, a driving roller mounted for rotation on said frame, said roller having a driving gear on one end, a driving knob connected to said driving roller, an idler gear mounted on said frame and being driven by said driving gear, a driven roller having a gear driven by said idler gear, said driven roller being mounted at each end in a bracket, each of said brackets being adapted for pivotal movement about the axis of said idler gear, an information bearing strip of flexible material suspended between said rollers and wound around at least one of said rollers, a spring connected between each of said brackets and said frame for maintaining said strip in a taut condition, said strip being moved by means of said driving knob actuating said gears and rollers, the axis of said driven roller describing an arcuate path about the axis of said idler gear as a center as said chart is moved.

References Cited in the file of this patent

UNITED STATES PATENTS

| | | |
|---|---|---|
| 189,794 | Schmitz | Apr. 17, 1877 |
| 1,394,234 | Talotta | Oct. 18, 1921 |
| 1,491,374 | Babson | Apr. 22, 1924 |
| 2,116,507 | Colin | May 10, 1938 |
| 2,154,251 | Reisiger | Apr. 11, 1939 |

FOREIGN PATENTS

| | | |
|---|---|---|
| 94,951 | Sweden | Mar. 8, 1939 |
| 706,203 | France | Mar. 24, 1931 |